United States Patent
Michenthaler et al.

(10) Patent No.: US 12,267,183 B2
(45) Date of Patent: Apr. 1, 2025

(54) SLAVE DEVICE, BUS SYSTEM, AND METHODS

(71) Applicant: Infineon Technologies AG, Neubiberg (DE)

(72) Inventors: Christof Michenthaler, Feistritz/Gail (AT); Leo Aichriedler, Puch (AT); Thomas Hafner, Klagenfurt (AT); Dirk Hammerschmidt, Finkenstein (AT)

(73) Assignee: Infineon Technologies AG, Neubiberg (DE)

( * ) Notice: Subject to any disclaimer, the term of this patent is extended or adjusted under 35 U.S.C. 154(b) by 476 days.

(21) Appl. No.: 17/761,300

(22) PCT Filed: Sep. 9, 2020

(86) PCT No.: PCT/EP2020/000153
§ 371 (c)(1),
(2) Date: Mar. 17, 2022

(87) PCT Pub. No.: WO2021/058123
PCT Pub. Date: Apr. 1, 2021

(65) Prior Publication Data
US 2022/0353108 A1 Nov. 3, 2022

(30) Foreign Application Priority Data
Sep. 23, 2019 (DE) .................... 10 2019 125 493.0

(51) Int. Cl.
*H04L 12/403* (2006.01)
*H04L 12/413* (2006.01)

(52) U.S. Cl.
CPC .......... *H04L 12/413* (2013.01); *H04L 12/403* (2013.01)

(58) Field of Classification Search
CPC .......................... H04W 24/08; H04W 74/0004
USPC ......................................... 370/329, 400, 395
See application file for complete search history.

(56) References Cited

U.S. PATENT DOCUMENTS

| | | | |
|---|---|---|---|
| 5,319,755 A | 6/1994 | Farmwald et al. | |
| 5,499,242 A | 3/1996 | Lee et al. | |
| 6,625,688 B1 | 9/2003 | Fruehling et al. | |
| 6,779,046 B1 | 8/2004 | Osuga | |
| 7,562,028 B1* | 7/2009 | Donner | G06Q 30/0603 705/5 |
| 7,774,528 B2 | 8/2010 | Deshpande et al. | |
| 2001/0030904 A1* | 10/2001 | Farmwald | G11C 7/1072 711/E12.089 |

(Continued)

FOREIGN PATENT DOCUMENTS

| CN | 101208679 A | 6/2008 |
|---|---|---|
| CN | 101235566 A | 8/2008 |

(Continued)

*Primary Examiner* — Dang T Ton
(74) *Attorney, Agent, or Firm* — Harrity & Harrity, LLP

(57) ABSTRACT

A method and slave devices are disclosed in which an address assignment to slave devices takes place with the aid of a collision detection. The slave device receives an initialization signal, transmits an identifier over a bus in response to the initialization signal, checks whether a collision occurs on the bus when transmitting the identifier, and if a collision occurs, places the slave device into an inactive state, and if no collision occurs, receives an address for the slave device after the transmission of the identifier.

20 Claims, 6 Drawing Sheets

(56) References Cited

U.S. PATENT DOCUMENTS

| | | |
|---|---|---|
| 2003/0097509 A1 | 5/2003 | Fry et al. |
| 2013/0166801 A1 | 6/2013 | Chun et al. |
| 2013/0326099 A1 | 12/2013 | Schmidt et al. |
| 2017/0083467 A1 | 3/2017 | Mishra et al. |
| 2021/0012853 A1 | 1/2021 | Murozuka |
| 2021/0111443 A1 | 4/2021 | Wang et al. |
| 2021/0209003 A1 | 7/2021 | Kowkutla et al. |

FOREIGN PATENT DOCUMENTS

| | | |
|---|---|---|
| CN | 103119916 A | 5/2013 |
| CN | 103279434 A | 9/2013 |
| CN | 104410547 A | 3/2015 |
| CN | 104516851 A | 4/2015 |
| CN | 109116249 B | 7/2020 |
| CN | 212208007 U | 12/2020 |
| CN | 113619389 A | 11/2021 |
| EP | 3534261 B1 | 11/2020 |
| KR | 20130071782 A | 7/2013 |
| KR | 20180087766 A | 8/2018 |
| WO | 9516200 A1 | 6/1995 |

\* cited by examiner

SLAVE DEVICE, BUS SYSTEM, AND METHODS

FIELD

The present disclosure relates to slave devices, bus systems and corresponding methods.

BACKGROUND

Bus systems enable communication between multiple bus participants. One exemplary application is represented by sensor systems in which multiple sensors communicate as slave devices with a control unit as the master device, for example in an automobile system. In some applications it is necessary here to assign unique addresses to the different sensors, so that the control unit can operate the sensors individually over a common bus.

In some conventional approaches such addresses are permanently assigned to slaves such as sensors, often at the completion of their production or in the context of a configuration when a bus system is set up. Appropriately preconfigured slave devices are thus used in this case. This is relatively inflexible, in addition to which, in cases in which multiple sensors share a single physical interface, can only be done with considerable effort.

SUMMARY

A method as claimed in claim 1, a slave device as claimed in claim 11, and a bus system as claimed in claim 16 are provided. The subsidiary claims define further embodiments.

According to one exemplary embodiment, a method is provided, including:
in a slave device,
receiving an initialization signal,
transmitting, in response to the initialization signal, an identifier of the slave device over a bus,
checking whether, when transmitting the initialization identifier, a collision occurs on the bus,
if a collision occurs, placing the slave device into an inactive state, and
if no collision occurs, receiving an address for the slave device after the transmission of the identifier.

According to a further exemplary embodiment, a slave device is provided, including:
a communication circuit for transmitting signals to a bus and for receiving signals from a bus, wherein the slave device is configured for:
receiving an initialization signal,
transmitting an identifier of the slave device, over a bus in response to the initialization signal,
checking whether a collision occurs on the bus when transmitting the identifier,
if a collision occurs, placing the slave device into an inactive state, and
if no collision occurs, receiving an address for the slave device after the transmission of the identifier.

The above summary only serves as a brief overview of some exemplary embodiments, and is not to be applied restrictively. In particular, other exemplary embodiments can comprise features other than the features discussed above.

DETAILED DESCRIPTION

Various exemplary embodiments are explained in detail below. These exemplary embodiments are only used for illustration, and are not to be applied restrictively. Features or components in the exemplary embodiments described can thus be replaced by alternative features or components, or even omitted. In addition to the features and components described, further features or components may also be present.

In particular, the exemplary embodiments described below relate primarily to an address assignment to slave devices of a bus system during an initialization. Other features of the communication system such as, for example, details of the signaling, protocols used, and the like, can be implemented in any conventional manner known for bus systems, and are therefore not specifically explained. For example, the communication in some exemplary embodiments can take place over a CAN bus, and apart from the address assignment described and the features and components associated with that, the communication can take place as in conventional communication over a CAN bus.

Features and components of different exemplary embodiments can be combined. Variations and modifications that are described for one of the exemplary embodiments can thus, for example, also be applied to other exemplary embodiments, and are therefore not repeatedly explained.

Figure 1:
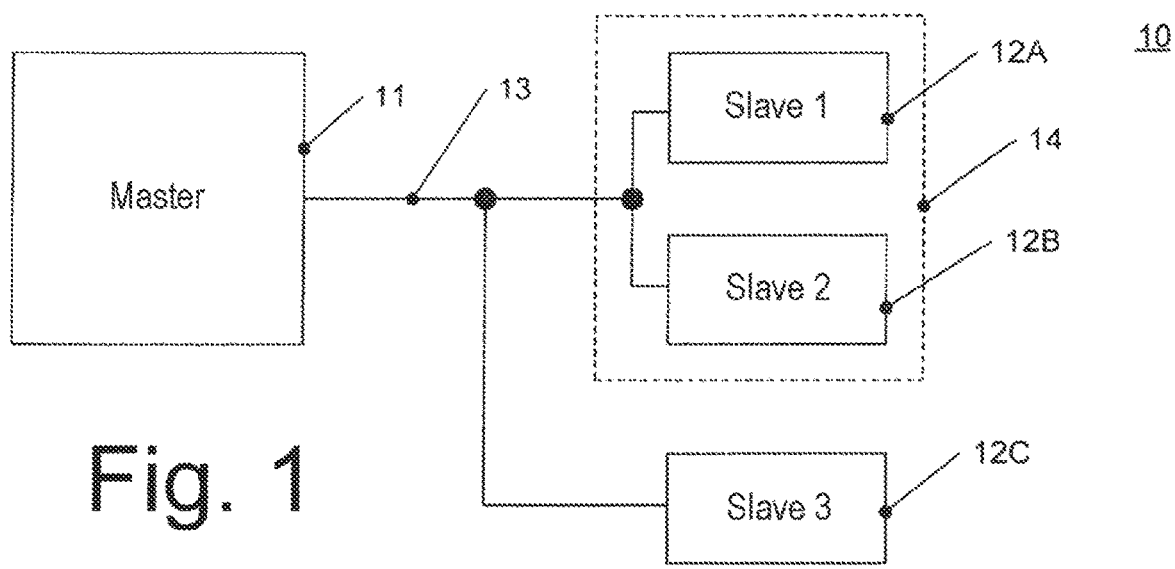
FIG. 1 shows a diagram of a bus system according to an exemplary embodiment.

FIG. 1 shows a block diagram of a system 10 according to one exemplary embodiment. The system of FIG. 10 comprises a master device 11 and multiple slave devices 12 that are connected via a bus 13. Three slave devices 12A, 12B, 12C are represented by way of example. The number of three slave devices 12 serves here merely as an example, and a different number of slave devices can also be provided. The bus 13 can be an arbitrary wired bus, for example a CAN bus, a FlexRay bus or the like. The bus 13 can be implemented in various configurations, for example a star configuration, a different branched configuration such as the components illustrated, a daisy-chain configuration, or the like.

In some exemplary embodiments it is also possible, as will be explained in more detail later, for multiple slave devices to be arranged in a cluster. As an example, the slaves 12A and 12B are arranged in a cluster 14 that has a single connection for the bus 13. A conversion from the bus 13 to a different communication within the cluster 14 can take place here. Examples of this are also explained in more detail later.

In some exemplary embodiments, the slave devices 12 are sensors and the master device 11 is a control unit. In some exemplary embodiments, the system 10 is arranged in a vehicle, for example a motor vehicle. In this case, the slave devices 12 can, for example, be sensors of the motor vehicle.

The master device can also be referred to, for short, as the master, and the slave devices can be referred to, for short, as slaves.

In an initialization phase of the system 10, the master device 11 assigns addresses to the slave devices 12, in order to be able to address them separately, for example, in the case of sensors, to be able to specifically read or drive individual sensors. A method for such an address assignment according to some exemplary embodiments will now be explained with reference to FIG. 2. The method of FIG. 2 can, for example, be carried out in the system 10 of FIG. 1 or following systems, and is described, for the sake of better understanding, with reference to FIG. 1. The method of FIG. 2 can, however, also be carried out in other systems.

Figure 2:
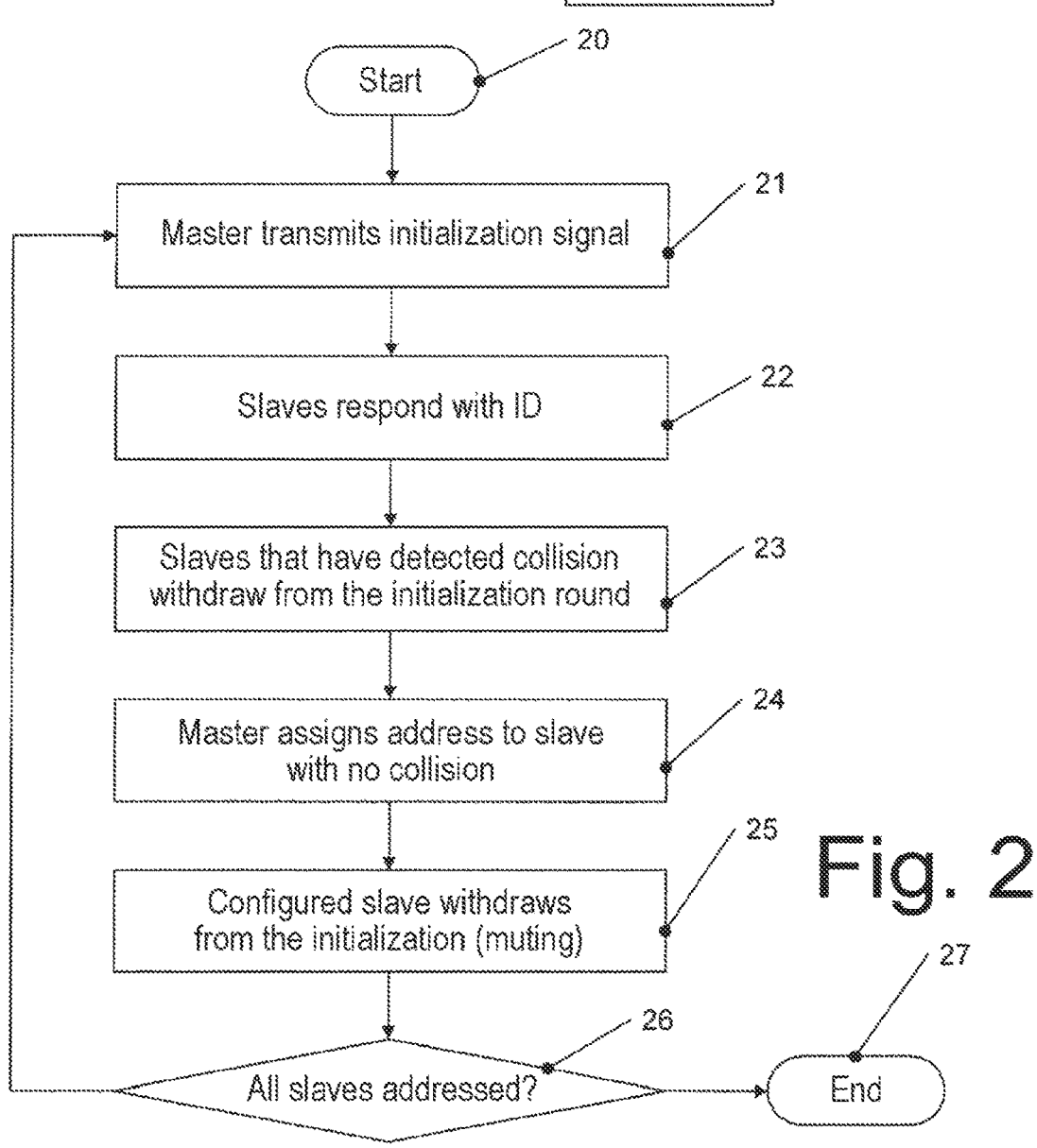
FIG. 2 is a flow diagram to illustrate methods according to some exemplary embodiments.

The method of FIG. 2 starts at 20. At 21, a master device, for example the master device 11 of FIG. 1, transmits an initialization signal over the bus, for example the bus 13 of FIG. 1. The initialization signal indicates to the slave devices, for example the slave devices 12 of FIG. 1, that the initialization is now starting. The initialization signal can be any predefined signal sequence, for example a predefined sequence of values that correspond to a logical 0 and values that correspond to a logical 1, that enables the slave devices to recognize that the initialization should now begin.

The slave devices 12 all have a predefined identifier that is, for example, programmed in during manufacture. In some exemplary embodiments, a unique 32-bit sequence can be used, although other sequence lengths are also possible. A possible number of different identifiers is selected here such that a unique identifier can be assigned to every manufactured slave device. Different ranges of identifiers can be reserved here for different manufacturers of slave devices.

At 22, all the slaves respond simultaneously with the identifier that has been assigned to them. All the slaves, for example, transmit the bit sequence that has been assigned to them.

In exemplary embodiments, a communication protocol is used here that has two possible levels on the bus that are assigned to a logical 0 and a logical 1. One of the levels here is dominant over the other level, meaning that if different bus participants drive different levels, the dominant level "wins". With CAN buses, this can, for example, be realized in that one of the levels is driven actively (in this case, a voltage difference between the bus lines above a threshold value corresponding to a logical 0), while the other value corresponds to a voltage difference at or close to 0, which develops passively as a result of a connection of the bus lines via a resistor, and corresponds to a logical 1. With this assignment, the logical 0 is dominant over the logical 1. In the context of this application, it is also said that a slave device "places" a level on a bus. Depending on the implementation, this can be done through active driving or also by "letting it settle", in that the slave device is passive and that, for example, the level settles due to a resistor with no active driving.

At 23, the slave devices detect a collision on the bus. From the point of view of a slave device, there is a collision when the value, e.g. voltage value, that is present on the bus does not correspond to the identifier it has transmitted. In the above exemplary embodiment with dominant and recessive states, this happens when another slave transmits a "more dominant" identifier than the slave that recognizes a collision.

Those slave devices that detect a collision then withdraw at 23 from the present "initialization round", that is to say the loop of FIG. 2 that is currently being passed through. One of the slave devices will here not detect a collision (e.g. because another slave device never drives a "more dominant" level during the transmission of the identifiers). The master device then assigns an address to the slave device at 24. The address of the slave device is thus configured, and at 25 it withdraws from the initialization, for example in that it remains muted.

Whether all the slave devices have received an address is checked at 26. If this is the case, the method finishes at 27; otherwise, the method jumps back to 21 for the next initialization round.

An example of such a collision detection is now briefly explained with reference to FIG. 3. The signals illustrated in FIG. 3 here serve merely as a simple example for clearer illustration, and are not to be applied restrictively, since signal forms can differ from one another depending on the implementation.

Figure 3:
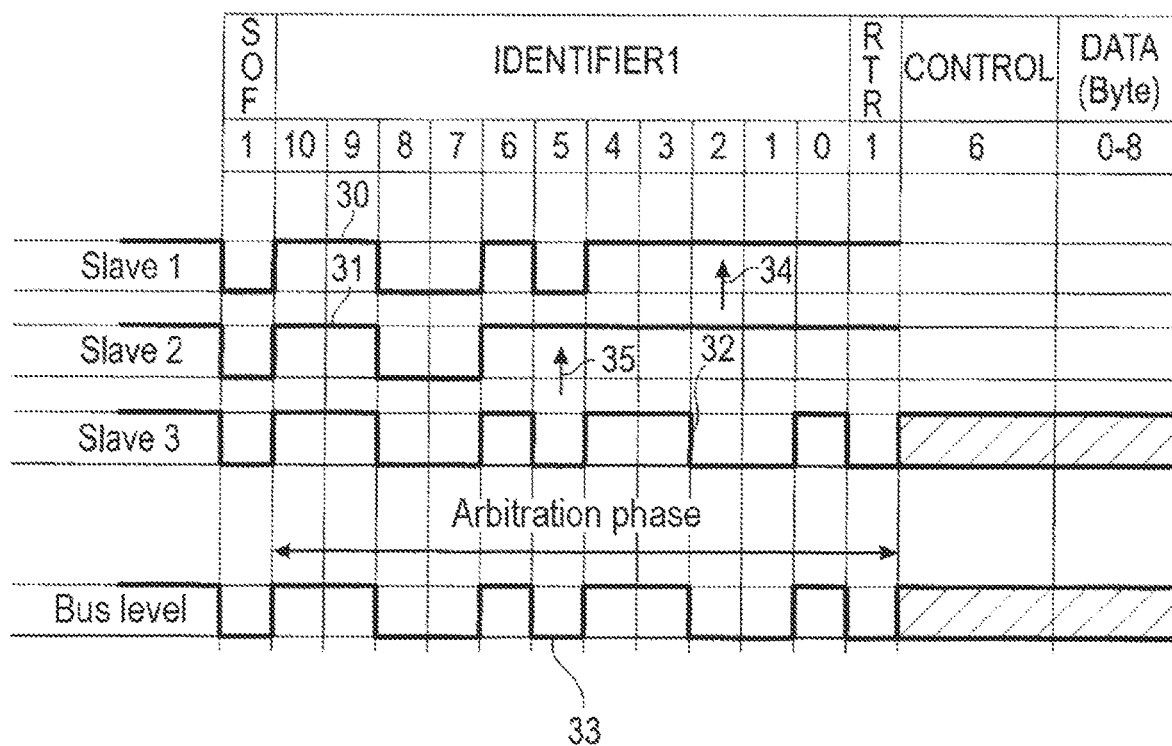
FIG. 3 shows examples of signals to illustrate exemplary embodiments.

FIG. 3 starts from a situation in which a low bus level is dominant and a high bus level is recessive so that if one participant wants to transmit a low bus level and another participant wants to transmit a high bus level, the bus level is altogether low. This is, for example, the case in a CAN bus.

In the example of FIG. 3 it is assumed that there are three slave devices (identified in FIG. 1 as slave 1, slave 2 and slave 3). Data transmitted by slave 1 are illustrated by a curve 30, data transmitted by slave 2 are illustrated by a curve 31, and the data transmitted by slave 3 are illustrated by a curve 32. A curve 33 shows the level on a bus.

After receiving the initialization signal (for example at 21 of FIG. 2) all the participants begin to transmit their identifier. This phase is also referred to as the arbitration phase. In the example of FIG. 3 this first occurs at a first bit that indicates the beginning of a data frame (SOF, start of frame), in which all slave devices pull the bus to a low level. The bus level is therefore low here. All the participants then transmit their identifier which comprises 11 bits in the example of FIG. 3. In the example of FIG. 3 this begins with the highest-value bit number 10, and continues to the lowest value bit 0.

The person skilled in the art will immediately recognize that in a CAN bus the arbitration has the result that a maximum prioritization of the bus access procedure is realized for the lowest identifier, as is also explained below. The participant with the highest priority (represented by a dominant address) prevails over all the other participants, and is allowed to transmit. This method is also known as CSMA-CR (Carrier Sense Multiple Access-Collision Resolution), and is used here to perform the address assignment. It is also possible to assign stepped priorities for individual participants.

In the example of FIG. 3, the address 1 for all the slave devices starts with the bit sequence 11001, which means that the slave devices transmit a high level for bits 10 and 9, a low level for bits 8 and 7, and a high level again for bit 6. Accordingly, the bus is also at a high level for bits 10 and 9, at a low level for bits 8 and 7, and again at a high level for bit 6.

The identifier of slave 1 and slave 3 continues at bit 5 with a 0 corresponding to a low level, while for slave 2 the identifier continues with a 1, which means a high level. Since, as explained above in the example of FIG. 3, the low level is dominant, the bus level at bit 5 is low. The slave 2 can thus recognize a collision at 35, which means at bit 5, since the bus level does not correspond to its transmitted identifier. The slave 2 thus withdraws, as explained for 23 in FIG. 2. In this example the slave 2 remains at the recessive state, which means the high level.

The identifier of slave 1 and slave 3 continues with bits 4 and 3 with the bit sequence 11, which means a high level, and the bus level is also high. At the next bit (bit 2) the bit value for the slave 1 is equal to 1 (high level), and for the slave 3 is low (low level). The bus level is thus low, and, as is indicated by an arrow 34, slave 1 now detects a collision (low bus level while it wants to transmit a high bus level corresponding to bit 1), and therefore also withdraws. Slave 3 has thus "won" this round, and transmits its full identifier (0 at bit 1 and 1 at bit 0), followed by a concluding bit (RPR) with a value of 0.

Following this, by means of control data (control) and data bytes (data), an address is assigned to slave 3, as the only one that has not detected a collision (corresponding to 24 of FIG. 2). Slave 3 is then muted for the next round, and only the slaves 1 and 2 transmit their identifiers. In this case, slave 1 will be the next to win, since the slave 2 will again detect a collision at 35. An address is then assigned to slave 2 as the last step. As can be seen, the slave device with the lowest identifier always "wins" in the case of the procedure illustrated in FIG. 3, in which the 0 is dominant and the highest-value bit is transmitted first. In other exemplary embodiments, it is also possible for the lowest-value bit to be transmitted first, in which case the lowest address does not automatically "win".

Even though the identifier is shown in FIG. 3 as 11-bit values (bits 0 to 10), more or fewer bits can also be used. In some exemplary embodiments, a 32-bit value can, for example, be used, which yields more than 4,000,000,000 possible identifiers. Different ranges of identifiers can here be assigned to different manufacturers of slave devices, who can then use them for their products. In this case, some of the bits can be occupied by a code that indicates the manufacturer.

Figure 4:
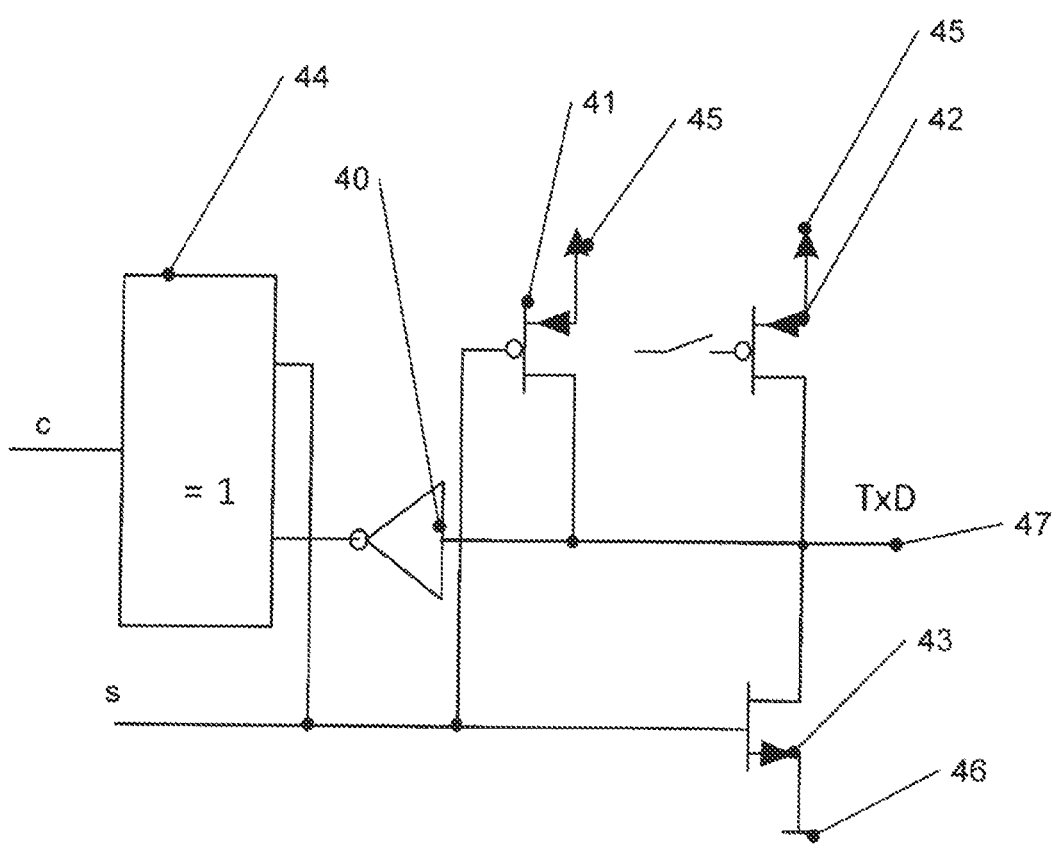
FIG. 4 shows a driver circuit with collision detection, as is used in some exemplary embodiments.

Various possibilities for collision detection and corresponding systems are explained even more closely below. FIG. 4 shows a transmission and collision detection circuit with collision detection via a transmit line TxD on which a transmission signal, in particular the identifier, is transmitted by a slave device. The transmission signal can be converted to a bus signal by a line driver.

A PMOS transistor 42 is connected in the circuit of FIG. 4 between a transmission terminal 47 and a positive supply voltage 45, and an NMOS transistor 43 is connected between the transmission terminal 47 and ground 46. In normal operation (after the initialization phase described above), the PMOS transistor 42 serves as a push transistor, and the NMOS transistor 43 as a pull transistor, in order to place the transmission terminal 47 optionally at the positive supply voltage 45 or ground 46. The positive supply voltage 45 can, for example, correspond to a logical 1, and ground 46 to a 0. The transistor 42 here exhibits a similar behavior to the transistor 43, for example through appropriate dimensioning, so that in this case the push transistor and the pull transistor are of approximately equal strength, i.e. have a similar capacity to drive current.

For the transmission of the identifier during the initialization phase, a PMOS transistor 41, which is also connected between the positive supply voltage 45 and the transmission output 47, is used instead of the PMOS transistor 42. The PMOS transistor 41 has lower dimensions than the PMOS transistor 42, which means that when switched on it has a lower current carrying capacity and/or higher resistance Ron. This means that when transmitting the identifiers, the PMOS transistor 45 acting as the push transistor is weaker than the NMOS transistor 43 acting as the pull transistor. If during the identification a transmitting circuit as shown in FIG. 4 now transmits a logical 1 corresponding to a high level of the supply voltage 45 (by closing the transistor 45 and opening the transistor 43), and another slave, using, a transmitting circuit of the same type transmits a logical 0 corresponding to the low level of the ground 46 (by closing the corresponding transistor 43 and opening the transistor 41), in total a logical 0 is present on the transmit line TxD corresponding to the ground level (since the transistor 45 used here is weaker). This will be recognized as a collision, by means of a collision detection circuit 40, 44 in the slave that transmits the logical 1. In particular, an inverted version of the signal is supplied through an inverter 40 a logic gate 44 on the list transmit line TxD along with a control signal s that is used to control the transistors 41, 43. The logic gate 44 then establishes whether the level on the transmit line TxD corresponds to the level intended on the basis of the control signal s.

In particular, in the event of a collision, the signal s drives the transistor 41 to be closed and the transistor 43 to be open, and a low voltage corresponding to ground potential is nevertheless present at the transmission output 47. In this case, the logic gate 44 outputs a corresponding collision signal c.

It is to be noted that in other embodiments an inverted logic is in principle also possible, using a weaker pull transistor that replaces the transistor 43 during the initialization.

Distinguishing between the initialization phase and a later operating phase in which the transistor 42 is then used can, for example, be done by means of an address flag in a slave device. As soon as the slave device has been assigned an address, the address flag is set, and the transistor 42 is used instead of the transistor 41.

The transmitting and collision detection circuit of FIG. 4 can, in particular, be used in cases in which multiple slave devices are arranged in one cluster and share a single line driver for a bus, for example a CAN bus. An example of such a system 50 is illustrated in FIG. 5.

Figure 5:
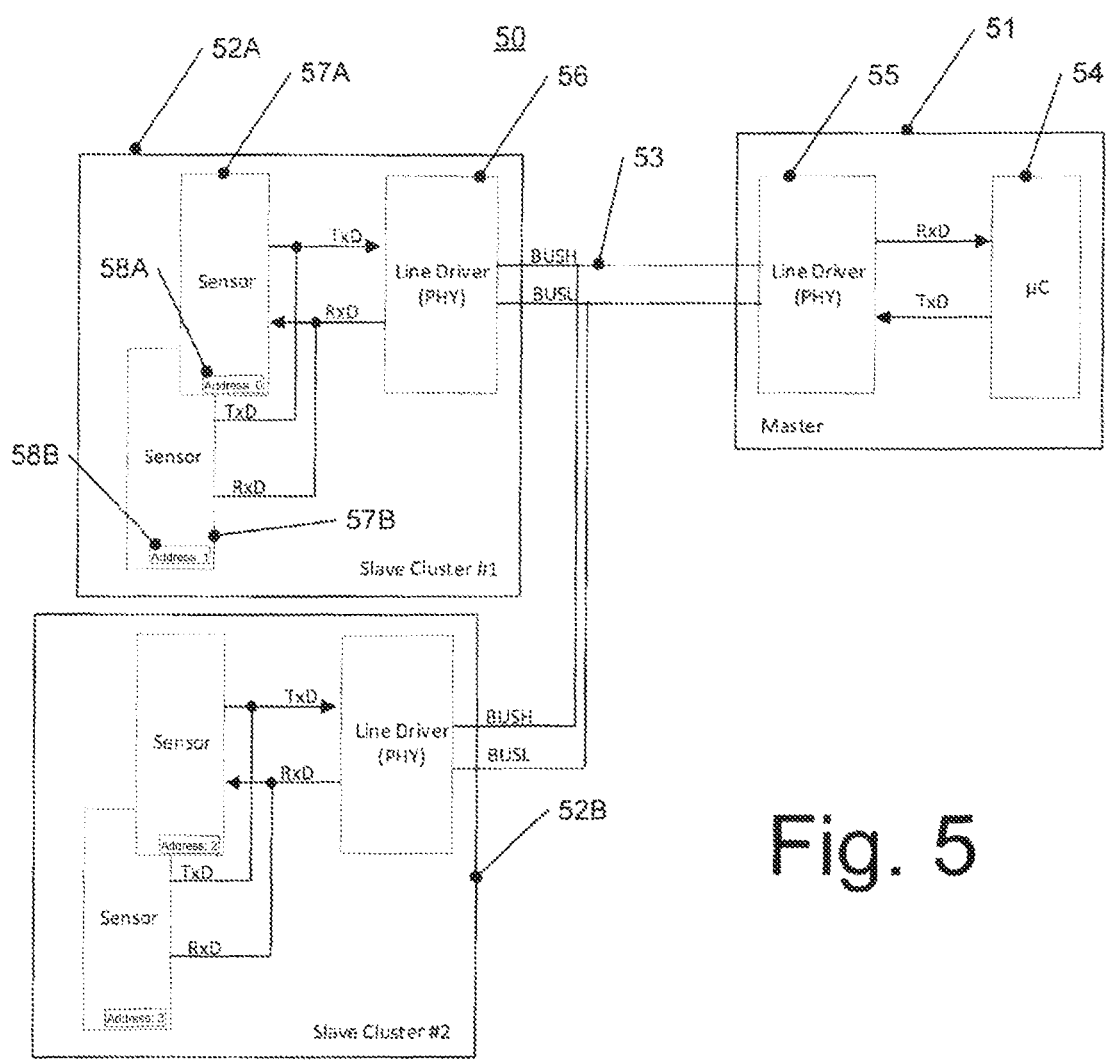
FIG. 5 shows a diagram of a system according to a further exemplary embodiment.

The system 50 of FIG. 5 comprises a master device 51 and multiple slave clusters 52, of which a first slave cluster 52A and a second slave cluster 52B are illustrated. The number of two slave clusters 52A, 52B is only to be understood here as an example, and it is also possible for only one slave cluster or for more than two slave clusters to be provided. The slave clusters 52 can, for example, each be implemented on a single chip.

The master device 51 is connected via a bus 53 to the slave clusters 52. In the example of FIG. 5, the bus 53 is a CAN bus with two lines BusH, BusL.

The master device 51 comprises a microcontroller 54 (MC) and a line driver 55 for driving the lines BusH, BusL of the bus 53. The microcontroller 54 transmits data that are to be transmitted over a transmit line TxD and reception at the line driver 55, and receives received data from the line driver via a receive line RxD. The transmitted data here comprise the initialization signal transmitted at 21 in FIG. 2, as well as the address assigned at 24 in FIG. 2, while the received data comprise the identifiers transmitted by the slave devices.

In the exemplary embodiment of FIG. 2, the slave clusters 52A and 52B are essentially identical in design. For that reason, only the slave cluster 52A is described in detail below, and the explanations apply accordingly to the slave cluster 52A. In other embodiments, different slave clusters can also have different designs, for example comprising different numbers or types of slave devices.

The slave cluster 52A comprises a line driver 56 for communication over the bus 53, as well as a number of sensors 57 that serve as examples for slave devices. In the example of FIG. 5A, the slave cluster 52A comprises a first sensor 57A and a second sensor 57B. More than two sensors 57 can also be provided in other exemplary embodiments. The sensors 57A and 57B communicate with the line driver 56 over a transmit line TxD and a receive line RxD. Data to be transmitted, such as the identifier explained above, are, for example, transmitted via the transmit line TxD over the bus 53. Data, for example the initialization signal that is transmitted by the master device 51 at 21 in FIG. 2, as well as the assigned address (24 in FIG. 2) are received over the bus 53 via the receive line RxD.

If the sensors 57A, 57B transmit different levels on the transmit line TxD, this can be detected, as was explained with reference to FIG. 4, using the local transmission and collision detection circuit. The collision detection is carried out in the same way for slaves of different slave clusters 52, wherein the corresponding level that a slave of one slave cluster transmits via the line driver 56 of the slave cluster 52 is also transmitted on the transmit lines TxD of the other slave clusters 52 (in the example of FIG. 5 with two slave clusters of the other slave cluster).

The addresses assigned using the method discussed here are then stored in the respective address registers 58A, 58B of the sensors 57A, 57B.

In other exemplary embodiments, collision detection can take place by means of a feedback function in that the transmission signal transmitted on the bus is fed back on receive lines. The collision detection can then take place by comparing the transmitted signal with the signal on the receive line. An exemplary system of this type is illustrated in FIG. 6.

Figure 6:
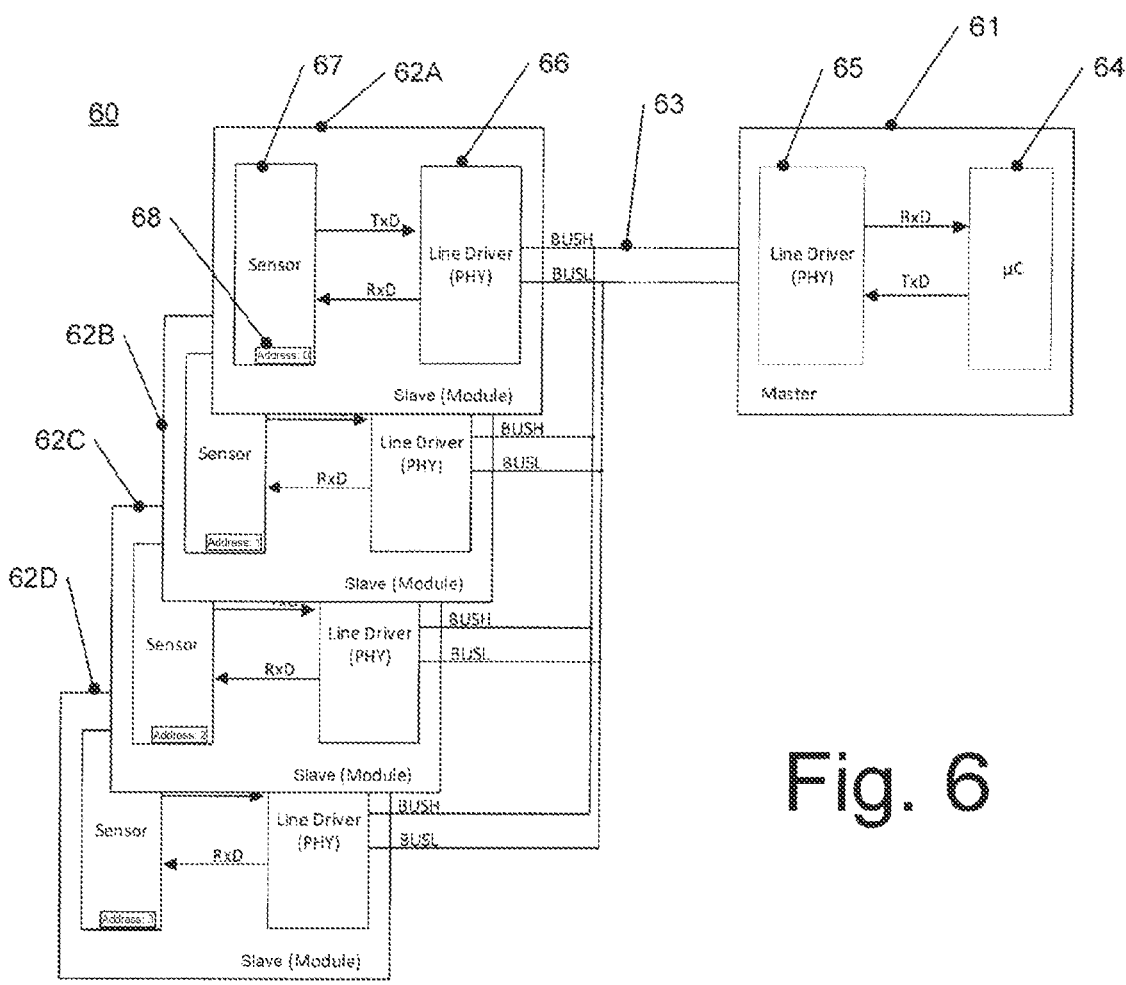
FIG. 6 shows a diagram of a system according to a further exemplary embodiment.

A system 60 of FIG. 6 comprises a master device 61 and a plurality of slave devices 62, of which four slave devices 62A, 62B, 62C and 62D are illustrated by way of example. The slave devices 62 are connected to the master device 61 via a bus 63 which in the example of FIG. 6 is designed as a two-wire bus with two bus lines BusH, BusL, in particular as a CAN bus.

The master device 61 comprises a microcontroller 64 and a line driver 65 which operate like the microcontroller 54 and line drivers 55 of the master device 51 of FIG. 5, and are therefore not described in detail again.

In the system 60 the slave devices 62A to 62D are of identical design. For that reason, only the slave device 62A is explained in more detail, and the description applies correspondingly to the slave devices 62B to 62D. In other exemplary embodiments, the slave devices can also be of different design.

The slave device 62A comprises a line driver 66 and a sensor 67. In other embodiments, other components can also be provided instead of the sensor 67.

The sensor 67 transmits signals that are to be transmitted via a transmit line TxD to the line driver 66, and receives received signals via a receive line RxD from the line driver 66 that accordingly converts signals between the bus 63 and the TxD, RxD lines. In particular, the sensor 67 transmits its identifier in response to an initialization signal as at 21 of FIG. 2 (at 22 in FIG. 2) and, if it does not detect a collision, receives an address assigned to it (for example at 24 in FIG. 2). This address is then stored in an address register 68.

For collision detection, during the initialization phase when transmitting the identifier, the corresponding value on the bus 63 is looped back as a received signal on the receive line RxD. By comparing a transmitted signal on the transmit line TxD with this received signal, a collision can be detected if the received signal differs from the transmitted signal (if, for example, the sensor 67 transmits a recessive value and another sensor transmits a dominant value). Collisions can be detected in this way. A transmission speed when transmitting the identifier is chosen here in such a way that collision detection can take place even in the presence of a loop delay when looping back. This delay depends, for example, on the power length in use. It should again be noted that the signals of FIG. 7 are only an example, and are not to be seen as restrictive.

Figure 7:
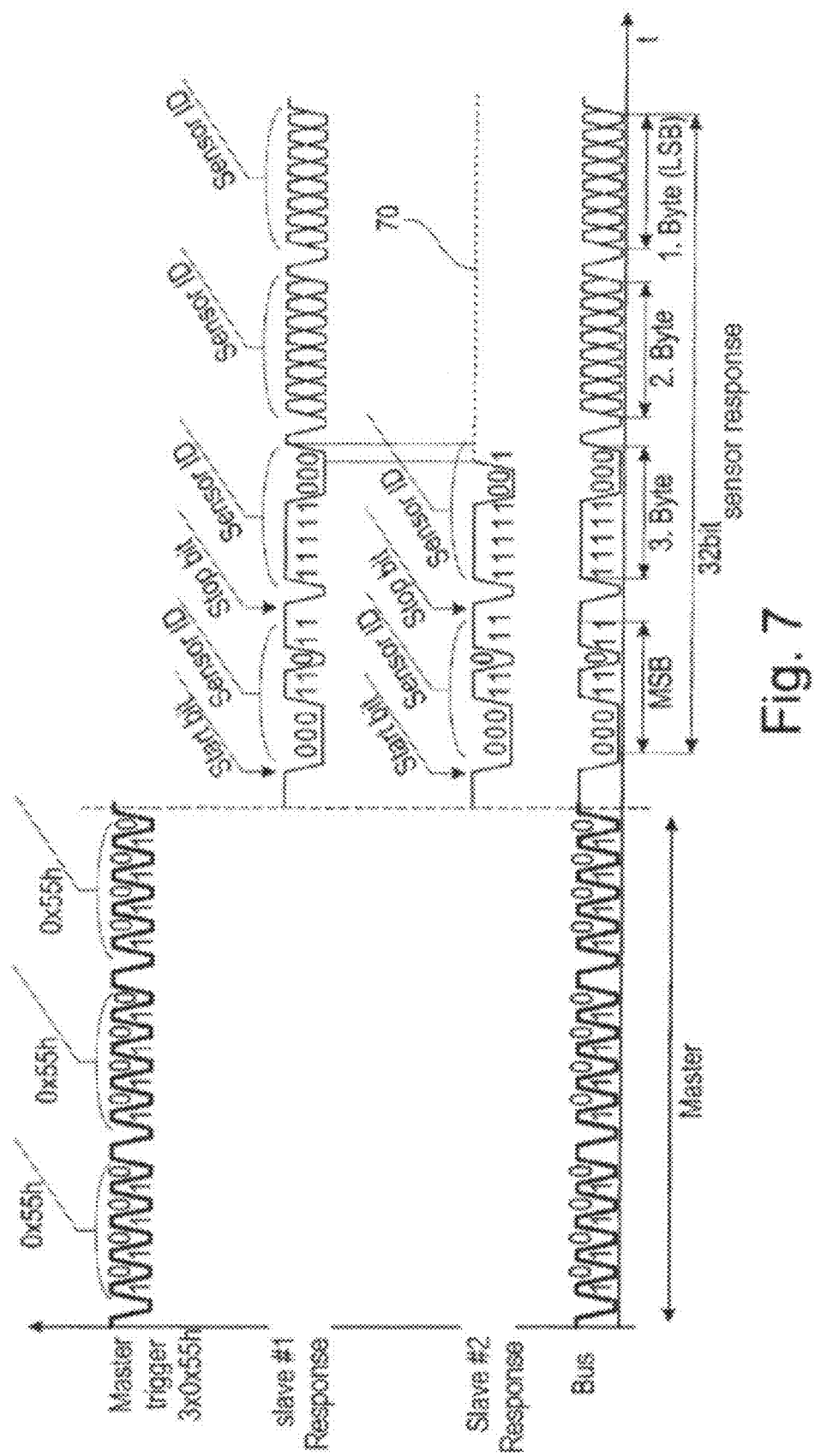
FIG. 7 shows examples of signals to illustrate some exemplary embodiments.

For further illustration, FIG. 7 shows a detailed example of signals as can, for example, be present in the system of FIG. 6. For the sake of simplicity, the signals for one master device and two slave devices are illustrated.

In the example of FIG. 7, the master device (for instance the master device 51 of FIG. 5 or the master device 61 of FIG. 6) first transmits an initialization signal (for example at 21 of FIG. 2). In the example of FIG. 7, the hexadecimal value 0x55h is transmitted three times, corresponding to 3 bytes with alternating 1 and 0 values, separated in each case by a start/stop bit. A redundancy is created through the triple repetition, in case a slave does not correctly identify the initialization signal the first time. Any other bit sequence that can be unambiguously identified as the initialization signal by the slave devices can also, however, be used. During this phase, labeled as Master in FIG. 7, a corresponding signal is then present on the bus.

After the initialization signal has completed, the slave devices then reply with their identifiers. These begin with a start bit, followed by a 4-byte (32-bit) long identifier, wherein the 4 bytes are separated from one another by a stop bit. In the example of FIG. 7 the first byte with the most significant bits (MSB) is 00011011 for both slave devices, so that no collision is present here. The next byte of the identifier (labeled as the third byte in FIG. 7) is 11111000 for the first slave and 11111001 for the second slave, so that a collision occurs at the last bit. It is again assumed that the 0 is dominant over the 1, so that a level corresponding to a 0 is present here on the bus. The second slave thus detects a collision (it wants to place a 1 on the bus, but the bus however shows a 0) and thus withdraws, muting itself, for example to the recessive state. This is identified in FIG. 7 with the reference number 70.

The first slave continues to transmit its identifier (labeled in FIG. 7 as the second byte and the first byte), and is then assigned its address, as has already been explained. The first slave then withdraws in the following round, so that in the case of two slave devices as in FIG. 7, the second slave device is assigned an address.

Addresses can in this way be assigned in the exemplary embodiments discussed here to a plurality of slaves, wherein collision detection ensures that it is always only one slave that receives an identifier.

Some exemplary embodiments are defined through the following examples:

Example 1. A method, comprising:
   in a slave device,
     receiving an initialization signal,
     transmitting, in response to the initialization signal, an identifier of the slave device over a bus,
     checking whether, when transmitting the initialization identifier, a collision occurs on the bus,
     if a collision occurs, placing the slave device into an inactive state, and if no collision occurs, receiving an address for the slave device after the transmission of the identifier.

Example 2. The method of example 1, wherein checking whether a collision is present on the bus comprises establishing that a collision is present if a level on the bus does not correspond to a value expected on the basis of the transmitted identifier.

Example 3. The method of example 1 or 2, wherein the bus has a dominant level or a recessive level, and wherein a collision on the bus is present if, when transmitting the identifier, the recessive level is placed on the bus by the slave device and the dominant level is present on the bus.

Example 4. The method of example 3, wherein the method comprises a transmission of a further identifier by a further slave device in response to the initialization signal, and wherein the collision is present on the bus if the further slave device places the dominant level on the bus.

Example 5. The method of one of examples 1 to 4, wherein checking whether a collision is present on the bus takes place on the basis of a signal on a transmit line of the slave device.

Example 6. The method of one of examples 1 to 5, wherein the slave device is arranged in a slave cluster in which multiple slave devices share one bus interface.

Example 7. The method of examples 5 or 6, wherein the slave device uses a push-pull driver to transmit the identifier, wherein one push transistor or push-pull transistor of the push-pull driver is weaker than the other push transistor or pull transistor.

Example 8. The method of one of examples 1 to 7, wherein checking whether a collision is present takes place on the basis of a signal on a receive line of the slave device.

Example 9. The method of one of examples 1 to 8, further comprising transmission of the initialization signal by a master device and transmission of the address by the master device.

Example 10. The method of one of examples 1 to 9, wherein the method is repeated at least until an address is assigned to the slave device.

Example 11. A slave device, comprising:
a communication circuit for transmitting signals to a bus and for receiving signals from the bus, wherein the slave device is configured for:
receiving an initialization signal,
transmitting an identifier of the slave device, over the bus in response to the initialization signal,
checking whether a collision occurs on the bus when transmitting the identifier,
if a collision occurs, placing the slave device into an inactive state, and
if no collision occurs, receiving an address for the slave device after the transmission of the identifier.

Example 12. The slave device of example 11, wherein checking whether a collision is present on the bus comprises establishing that a collision is present if a level on the bus does not correspond to a value expected on the basis of the transmitted identifier.

Example 13. The slave device of example 11 or 12, wherein the bus has a dominant level or a recessive level, and wherein a collision is present on the bus if, when transmitting the identifier, the recessive level is placed on the bus by the slave device and the dominant level is present on the bus.

Example 14. The slave device of example 13, wherein a collision is present on the bus if the further slave device places the dominant level on the bus.

Example 15. The slave device of one of examples 11 to 14, wherein checking whether a collision is present on the bus takes place on the basis of a signal on a transmit line of the slave device.

Example 16. The slave device of example 15, wherein the slave device is arranged in a slave cluster in which multiple slave devices share one bus interface.

Example 17. The slave device of examples 15 or 16, wherein the slave device comprises a push-pull driver for transmitting the identifier, wherein one push transistor or push-pull transistor of the push-pull driver is weaker than the other of the push transistors or pull transistors.

Example 18. The slave device of one of examples 11 to 17, wherein checking whether a collision is present takes place on the basis of a signal on a receive line of the slave device.

Example 19. A system comprising a slave device of one of examples 11 to 18, and a master device that is designed for transmitting the initialization signal and for transmitting the address.

Example 20. The system of example 19, comprising multiple slave devices,
wherein the master device is designed to transmit the initialization signal again after transmitting the address until an address is assigned to all the slave devices.

Although specific exemplary embodiments have been illustrated and described in this description, persons with usual technical knowledge will recognize that a large number of alternatives and/or equivalent implementations can be selected as substitutes for the specific exemplary embodiments that are shown and described in this description, without leaving the scope of the disclosed invention. It is the intention that this application covers all adaptions or variations of the specific exemplary embodiments that are discussed here. It is therefore the intention that this invention is only restricted by the claims and the equivalents of the claims.

What is claimed is:

1. A method, comprising:
receiving, by a slave device, an initialization signal;
transmitting, by the slave device, in response to the initialization signal, an identifier of the slave device over a bus;
checking, by the slave device, whether, when transmitting the identifier, a collision occurs on the bus,
wherein the bus has a dominant level or a recessive level, and
wherein a collision is present on the bus if, when transmitting the identifier, the recessive level is placed on the bus by the slave device as a result of transmitting the identifier and the dominant level is detected as being present on the bus while transmitting the identifier on the bus; and
if a collision occurs, placing, by the slave device, the slave device into an inactive state, and if no collision occurs, receiving, by the slave device, an address for the slave device after the transmission of the identifier.

2. The method as claimed in claim 1, wherein checking whether a collision is present on the bus comprises establishing that a collision is present if a level detected on the bus does not correspond to a value expected on the bus, wherein the value expected on the bus is based on the transmitted identifier.

3. The method as claimed in claim 1, wherein the bus has a dominant level or a recessive level, and wherein a collision on the bus is present if, when transmitting the identifier, the recessive level is placed on the bus by the slave device as a result of transmitting the identifier and the dominant level is detected by the slave device as being present on the bus while transmitting the identifier on the bus.

4. The method as claimed in claim 3, wherein the method further comprises transmitting a further identifier by a further slave device in response to the initialization signal, and wherein the collision is present on the bus if the further slave device places the dominant level on the bus in response to the initialization signal.

5. The method as claimed in claim 1, wherein checking whether a collision occurs on the bus takes place based on a signal on a transmit line of the slave device.

6. The method as claimed in claim 1, wherein the slave device is arranged in a slave cluster in which multiple slave devices share one bus interface.

7. The method as claimed in claim 5, wherein the slave device uses a push-pull driver to transmit the identifier, wherein a first one of a push transistor or a pull transistor of the push-pull driver is weaker than a second one of the push transistor or the pull transistor.

8. The method as claimed in claim 1, wherein checking whether a collision occurs on the bus takes place based on a signal on a receive line of the slave device.

9. The method as claimed in claim 1, the method further comprising transmitting the initialization signal by a master device and transmitting the address by the master device.

10. The method as claimed in claim 1, wherein the method of claim 1 is repeated at least until an address is assigned to the slave device.

11. A slave device, comprising:
a communication circuit configured to transmit signals to a bus and receive signals from the bus, wherein the communication circuit is further configured to receive an initialization signal and transmit an identifier of the slave device over the bus in response to the initialization signal;
at least one processor configured to check whether a collision occurs on the bus when the identifier is transmitted over the bus,
wherein the bus has a dominant level or a recessive level,
wherein a collision is present on the bus if, when transmitting the identifier, the recessive level is placed on the bus by the slave device as a result of transmitting the identifier and the dominant level is detected by the at least one processor as being present on the bus while transmitting the identifier on the bus,
wherein if a collision occurs, the at least one processor is configured to place the slave device into an inactive state, and
wherein if no collision occurs, the at least one processor is configured to receive an address for the slave device after the transmission of the identifier.

12. The slave device as claimed in claim 11, wherein the at least one processor is configured to check whether a collision is present on the bus by establishing that a collision is present if a level on the bus does not correspond to a value expected on the bus, wherein the value expected on the bus is based on the transmitted identifier.

13. The slave device as claimed in claim 11, wherein a collision is present on the bus if a further slave device places the dominant level on the bus in response to the initialization signal while the recessive level is placed on the bus by the slave device.

14. The slave device as claimed in claim 11, wherein checking whether a collision is present on the bus takes place based on a signal on a transmit line of the slave device.

15. The slave device as claimed in claim 14, wherein the slave device is arranged in a slave cluster in which multiple slave devices share one bus interface.

16. The slave device as claimed in claim 14, wherein the slave device further comprises a push-pull driver for transmitting the identifier, wherein a first one of a push transistor or a pull transistor of the push-pull driver is weaker than a second one of the push transistor or the pull transistor.

17. The slave device as claimed in claim 11, wherein checking whether a collision is present takes place based on a signal on a receive line of the slave device.

18. A system comprising:
a slave device comprising:
a communication circuit configured to transmit signals to a bus and receive signals from the bus, wherein the communication circuit is further configured to receive an initialization signal and transmit an identifier of the slave device over the bus in response to the initialization signal; and
at least one processor configured to check whether a collision occurs on the bus when the identifier is transmitted over the bus,
wherein the bus has a dominant level or a recessive level,
wherein a collision is present on the bus if, when transmitting the identifier, the recessive level is placed on the bus by the slave device as a result of transmitting the identifier and the dominant level is detected as being present on the bus while transmitting the identifier over the bus, and
wherein, if a collision occurs, the at least one processor is configured to place the slave device into an inactive state, and
wherein, if no collision occurs, the at least one processor is configured to receive an address for the slave device after the transmission of the identifier; and
a master device configured to transmit the initialization signal and the address.

19. The system as claimed in claim 18, further comprising:
multiple slave devices, wherein the master device is configured to transmit the initialization signal again after transmitting the address, until an address is assigned to all of the multiple slave devices.

20. The slave device of claim 11, wherein if no collision occurs, the at least one processor is further configured to mute the slave device.

* * * * *